(12) United States Patent
Dumanski et al.

(10) Patent No.: US 9,856,964 B2
(45) Date of Patent: Jan. 2, 2018

(54) GEAR

(71) Applicants: Miba Sinter Austria GmbH, Laakirchen (AT); Metaldyne International Deutschland GmbH, Dieburg (DE)

(72) Inventors: Christian Dumanski, Plesching-Steyregg (AT); Stefan Weyand, Michelstadt (DE); Juergen Depp, Michelstadt (DE)

(73) Assignees: Miba Sinter Austria GmbH, Laakirchen (AT); Metaldyne International Deutschland GmbH, Dieburg (DE)

( * ) Notice: Subject to any disclaimer, the term of this patent is extended or adjusted under 35 U.S.C. 154(b) by 369 days.

(21) Appl. No.: 14/620,643

(22) Filed: Feb. 12, 2015

(65) Prior Publication Data
US 2015/0226304 A1    Aug. 13, 2015

(30) Foreign Application Priority Data
Feb. 13, 2014 (AT) .............................. A 50109/2014

(51) Int. Cl.
*F16H 55/18* (2006.01)
*F16H 55/17* (2006.01)
(Continued)

(52) U.S. Cl.
CPC ............. *F16H 55/18* (2013.01); *F16H 55/14* (2013.01); *F16H 55/17* (2013.01); *F16H 2057/126* (2013.01); *Y10T 74/19898* (2015.01)

(58) Field of Classification Search
CPC ..... F16H 55/18; F16H 55/14; F16H 2057/126
See application file for complete search history.

(56) References Cited

U.S. PATENT DOCUMENTS 2,307,129 A    1/1943    Hines et al.
2,585,971 A    2/1952    Sloane
(Continued)

FOREIGN PATENT DOCUMENTS

DE          7135220 U1    5/1972
DE       31 53 109 C2    2/1986
(Continued)

*Primary Examiner* — David M Fenstermacher
(74) *Attorney, Agent, or Firm* — Collard & Roe, P.C.

(57) ABSTRACT

The invention relates to a gear (1) comprising a first, radially inner ring element (2), a second, radially outer ring element (3) and a connecting element (4), wherein the second, radially outer ring element (2) comprises a toothing (10), wherein the connecting element (3) is arranged in radial direction between the first, radially inner ring element (2) and the second, radially outer ring element (3) and is connected to the first, radially inner ring element (2) and the second, radially outer ring element (3), and wherein the connecting element (4) is made at least partly from a rubber-elastic material. In this case edges (11, 12) of the first, radially inner ring element (2) in the connecting area between the first, radially inner ring element (2) and the connecting element (4) and edges (16, 17) in the connecting area between the second, radially outer ring element (3) and the connecting element (4) are provided with a rounding (21 to 24).

8 Claims, 4 Drawing Sheets

(51) Int. Cl.
*F16H 55/14* (2006.01)
*F16H 57/12* (2006.01)

(56) References Cited

U.S. PATENT DOCUMENTS

| | | | | |
|---|---|---|---|---|
| 3,952,546 | A * | 4/1976 | Nakano | F16D 3/76 416/134 A |
| 4,178,811 | A * | 12/1979 | Shepherd | F16F 15/136 188/17 |
| 4,674,351 | A * | 6/1987 | Byrd | F16D 3/76 464/90 |
| 5,117,704 | A * | 6/1992 | Kish | B64C 27/12 464/75 |
| 5,307,705 | A * | 5/1994 | Fenelon | B29C 70/84 264/242 |
| 5,452,622 | A * | 9/1995 | Fenelon | F16H 55/14 264/242 |
| 5,911,788 | A * | 6/1999 | Russ | F16H 55/14 74/411 |
| 5,956,998 | A * | 9/1999 | Fenelon | E05B 81/25 292/144 |
| 6,705,176 | B2 | 3/2004 | Ishii et al. | |
| 8,070,632 | B2 | 12/2011 | Yuan | |
| 8,978,501 | B2 * | 3/2015 | Demtroder | B23P 11/025 29/893 |
| 9,482,334 | B2 * | 11/2016 | Buchleitner | F16H 55/17 |
| 9,506,550 | B2 * | 11/2016 | Dickinger | F16H 55/18 |
| 9,605,744 | B2 * | 3/2017 | Mandel | B22F 3/12 |
| 2008/0141811 | A1 | 6/2008 | Sandner | |
| 2013/0192403 | A1 | 8/2013 | Kozilek et al. | |
| 2014/0018177 | A1 | 1/2014 | Drechsler et al. | |

FOREIGN PATENT DOCUMENTS

| | | |
|---|---|---|
| DE | 44 26 325 A1 | 3/1995 |
| DE | 602 05 710 T2 | 5/2006 |
| DE | 10 2009 015 958 A1 | 9/2010 |
| DE | 10 2011 120 266 A1 | 6/2013 |
| DE | 10 2011 120 676 A1 | 6/2013 |
| EP | 1 245 869 A2 | 10/2002 |
| EP | 2 623 820 A1 | 8/2013 |
| FR | 2 730 022 A1 | 8/1996 |
| WO | 2005/090830 A1 | 9/2005 |

* cited by examiner

GEAR

CROSS REFERENCE TO RELATED APPLICATIONS

Applicants claim priority under 35 U.S.C. §119 of Austrian Application No. A 50109/2014 filed on Feb. 13, 2014, the disclosure of which is incorporated by reference.

The invention relates to a gear comprising a radially inner ring element, a radially outer ring element and a connecting element, wherein the radially outer ring element comprises a toothing, wherein the connecting element is also arranged in radial direction between the radially inner ring element and the radially outer ring element and is connected to the radially inner ring element and the radially outer ring element, and wherein the connecting element is made at least partly from a rubber-elastic material.

Balance shafts are known to be used in combustion engines in order to reduce vibrations caused by a free inertia forces and inertia torques. The balance shaft is usually driven by the crankshaft and the latter is in operative connection therewith via a gear. In order to reduce the development of noise from the intermeshing toothings between the balance shaft and the crankshaft and to capture the vibrations divided gear wheels are known from the prior art, wherein the two parts are connected by a rubber-elastic connecting element.

Divided gears of this kind are mainly known for damping the vibration and noise of machine components. Thus for example DE 71 35 220 U1 describes a vibration-damped gear wheel with an inner part which has an annular groove on its outer casing surface, an annular outer part arranged concentric to and at distance from the inner part, which outer part on its inner casing surface also has an annular groove, which together with the annular groove arranged on the inner part forms an annular space, into which a rubber-elastic profile ring connecting the inner part and outer part in a non-rotatable manner is inserted, the undeformed radial extension of which is greater than that of the annular space formed between the inner and outer part, wherein at least one of the two annular grooves comprises extensions preferably arranged with a regular pitch.

A similar gear is known from U.S. Pat. No. 2,307,129 A, but with a differently shaped elastic connecting element, which has a rectangular cross section.

Instead of a simple profile ring the elastic connecting element can also be made from a laminate, as known for example from U.S. Pat. No. 4,674,351 A.

From EP 2 623 820 A a gear is known comprising an inner part, which is connected to the source of the vibrations, a connecting element and a gear rim, wherein the connecting element is designed so that the vibrations are reduced. The connecting element can be made from an elastic synthetic material, such as RTV-plastic, silicone or a resin system The rubber-elastic connecting elements are also used for centering the parts of the divided gear connected therewith, as known from DE 31 53 109 02. This document describes a noise-dampened machine element, consisting of two parts connected together in a form-fitting manner by a damping element, in particular parts arranged coaxially to one another, in particular the hub and running rim of a wheel, wherein the damping element connecting the two parts and bearing on oblique walls is made from a pourable material, which passes from the pourable state by shrinking to the elastic state, wherein the parts connected by the damping element comprise mounting spaces arranged evenly about the common axis, and open towards the joint for the material on the oblique walls, wherein during the shrinkage the material forms a tension rod and is drawn in a centering manner against said wall as in a clamping cone or clamping wedge.

DE 602 05 710 T2 describes a balance system for a combustion engine, comprising a drive shaft which supports a first pinion which is driven by a gear ring of the crankshaft of the engine, and a second pinion, which drives a driven shaft by a third pinion which is firmly secured onto the latter, wherein the first pinion contains a ring made of flexible material, such as e.g. rubber, which is inserted between two rings made of steel, which are each secured to the drive shaft and the inside of the pinion. In this document it has already been recognized that the flexible ring absorbs the oscillations transmitted by the crankshaft and is thus subjected to increased load. Therefore, in a special embodiment it is proposed that the ring has the form of a daisy or an elliptical form, in order to introduce a non-linear rigidity into the system so that resonance phenomena are avoided which can cause a tear in the system, with a disconnection of the vibrations which come from the crankshaft.

Particularly with the use of such gears in balance shafts, said gears are subjected to an increased mechanical load because of the unbalance, which means that the axial spacing of the inner ring element relative to the outer ring changes. In this way the elastic connecting element arranged between two said ring elements is subjected to a continually changing tensile and compressive load. As a result the connecting element may get torn off.

The basic objective of the present invention is to improve the connection of the elastic connecting element to the two ring elements in a gear of this kind.

Said objective of the invention is achieved in the aforementioned gear in that edges of the radially inner ring element in the connecting area between the radially inner ring element and the connecting element and edges in the connecting area between the radially outer ring element and the connecting element are provided with a rounding.

It is an advantage in this case that in this way the fatigue strength of the gear, in particular the connecting element, can be improved. By forming round edges on the radially inner and the radially outer ring element the point-like overloading of the connecting area on the edges can be avoided. In this way the continually changing compressive and tensile stresses of the connecting element can be absorbed by the latter more effectively. Furthermore, also a notching effect on the edges can also be avoided. It is thus possible to configure the connecting element to have a simpler geometry, so that a complicated form of the connecting element, as used in the aforementioned DE 602 05 710 T2 to avoid breakage of the system, is not necessary. By means of the rounding the surfaces which are available for connecting the radially inner ring element and the radially outer ring element to the connecting element are increased, whereby also the fatigue strength can be improved. By means of the rounded edges with a flush configuration of the connecting element to the axial end faces of the two ring element, the connecting element radially encloses the ring elements in the connecting area, whereby tensile and compressive stresses of the gear can also be absorbed more effectively in axial direction. As a secondary effect the rounded edges have the advantage that the two ring elements can be removed from molds more easily, if the latter are made from sintered materials.

According to one embodiment variant of the gear the connecting element protrudes in axial direction over the radially inner ring element and the radially outer ring element and in radial direction partly overlaps the radially inner ring element and/or the radially outer ring element. In this way a further improvement of the bond of the connecting element with the two ring elements is achieved, whereby subsequently the fatigue strength of said connection can be achieved.

For the same reasons it is also possible that the radially inner ring element on at least one axial end face comprises a recess and/or the radially outer ring element on at least one axial end face comprises a recess and that the connecting element engages in the recess or the recesses. For the above reasons in this case edges of the recesses in the axial end face are also provided with a rounding.

Alternatively, or in addition to improve the bond between the connecting element and the ring elements it is also possible that the radially inner ring element on at least one radial surface comprises a recess and/or the radially outer ring element on at least one radial surface has a recess and the connecting element engages in the recess or recesses, whereby it is preferable if edges of the recesses in the radial surfaces are also provided with a rounding.

Preferably, the connecting element is vulcanized onto the radially inner ring element and the radially outer ring element, as in this way the shaping of the soundings in the region of the rounded edges in the connecting element is performed more completely and with an accurate fit.

It is also possible for the radially inner ring element to be arranged on an unbalance element. In this way the lever that the unbalance element has in relation to the connecting element can be shortened significantly, so that then the mechanical load of the connecting element can be reduced, particularly in the connecting area. Furthermore, in this way a compact assembly can be provided, in particular for a balance shaft, by means of which a reduction of the structural length can be achieved in axial direction.

For a better understanding of the invention the latter is explained in more detail with reference to the following figures.

In a simplified, schematic representation shows.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
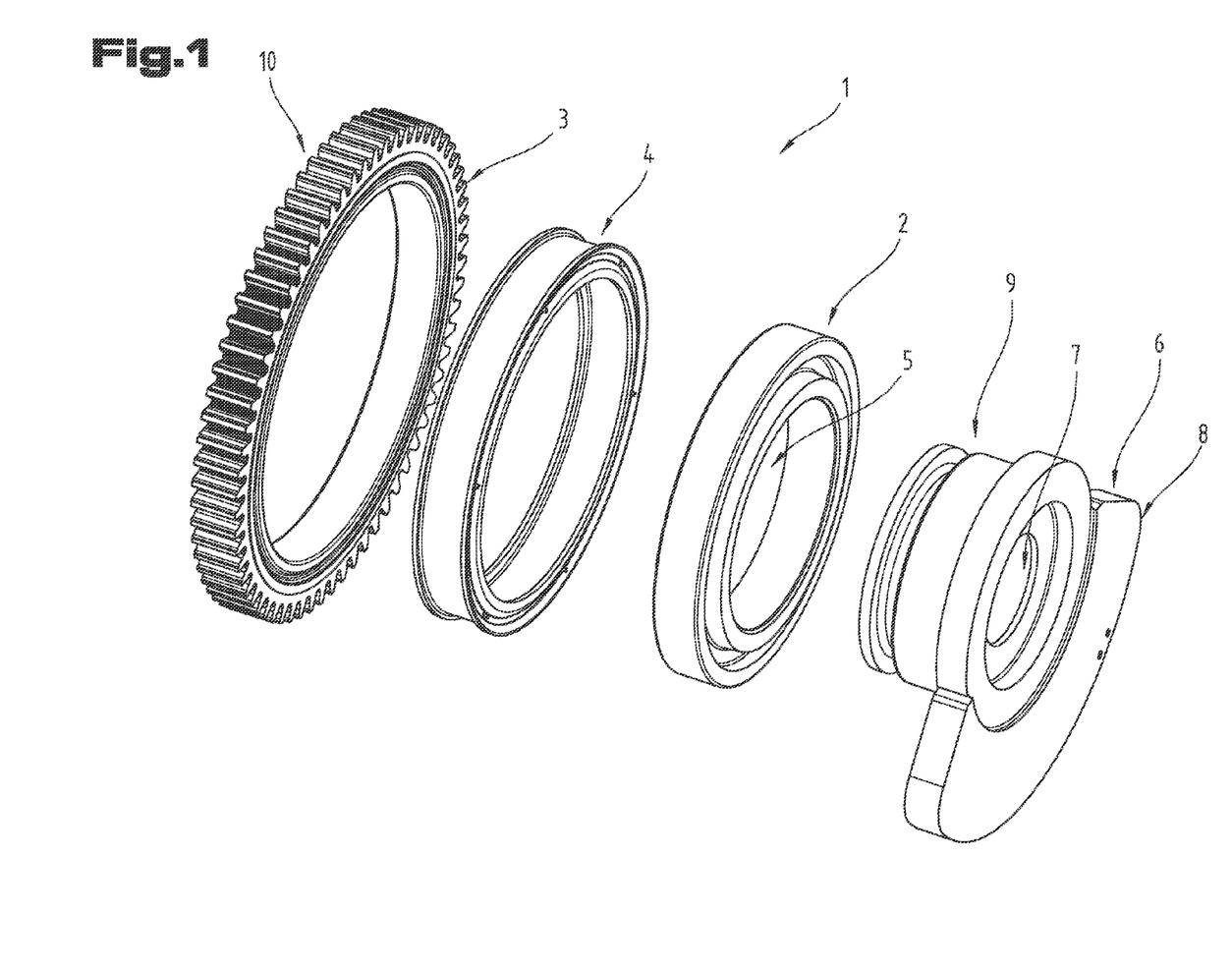
FIG. 1 a first embodiment variant of the gear in an exploded view.
Figure 2:
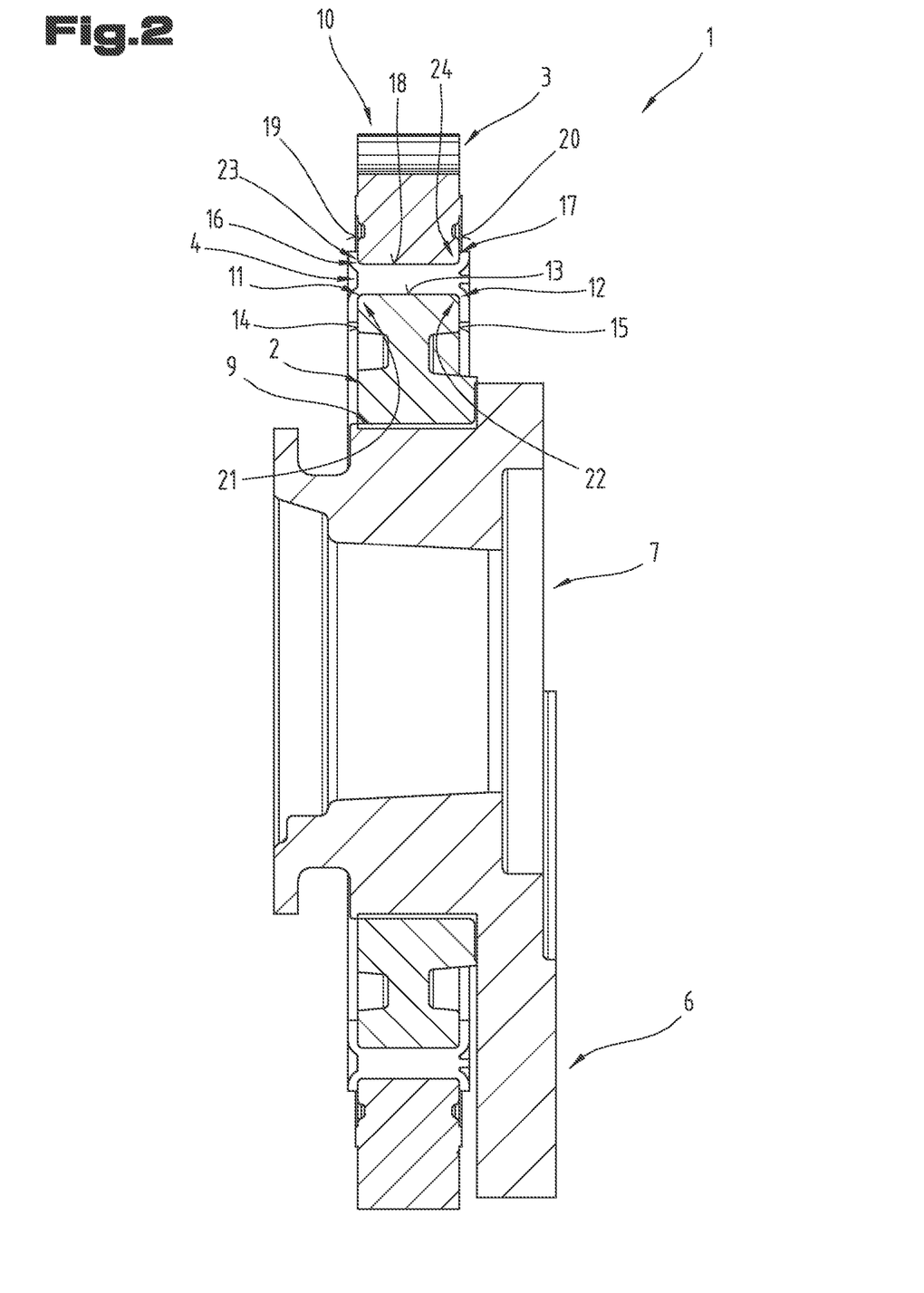
FIG. 2 the gear according to FIG. 1 in side view.

FIGS. 1 and 2 show a first embodiment variant of a gear 1. The gear 1 consists of or comprises a first, radially inner ring element 2, a second, radially outer ring element 3 and a connecting element 4. The first, radially inner ring element 2 can also be referred to as a hub part and the second, radially outer ring element 3 as a gear rim.

The first, radially inner ring element 2 and/or the second, radially outer ring element 3 preferably consist of a metal material, for example a steel, preferably a sintered material, for example a sintered steel. Other metal materials can also be used however for the radially inner ring element 2 and/or the radially outer ring element 3, wherein the radially inner ring element 2 and/or the radially outer ring element 3 can also consist of at least two different metal materials.

The connecting element 4 consists at least partly of a rubber elastic material, for example a (X)NBR ((carboxylated) acrylonitrile-butadiene-rubber), HNBR (hydrated nitrile-rubber), a silicone-rubber (VMQ), NR (natural rubber), EPDM (ethylenepropylene-diene-rubber), CR (chloroprene-rubber), SBR (styrene butadiene rubber) etc., wherein mixtures of material can also be used.

The term "at least partly" means that reinforcing elements, such as e.g. fibers and/or threads, made for example of metal, plastic, natural fibers etc., or rods can be embedded into the connecting element 4. However, the connecting element 4 is preferably made solely of a rubber-elastic material.

The first, radially inner ring element 2 comprises a recess 5 running in axial direction, in particular a bore. In this way the first, radially inner ring element 2 can be arranged on a not shown shaft, or as shown in FIGS. 1 and 2, according to an embodiment variant of the invention or an unbalance element 6. The unbalance element 6 can in turn comprise a recess 7, in particular a bore, for arranging on a shaft.

Unbalances of this kind are used in particular in balance shafts of combustion engines.

To form the unbalance the unbalance element 6 has an uneven distribution of mass which is achieved by the formation of an unbalance mass 8, wherein said unbalance mass is arranged or formed only over a portion of the periphery of the unbalance element 6.

The first, radially inner ring element 2 is preferably arranged concentrically to the unbalanced element 6 on the latter. For this the unbalance element 6 has a hub area projecting in axial direction of the gear 1.

The second, radially outer ring element 3 comprises a toothing 10 on the radially outer end face. Said toothing 10 can have a form adapted to the respective application of the gear 1, for example for the configuration of a gear wheel. Furthermore, the toothing 10 can extend in axial direction of the gear 1 over the entire width of the second, outer ring element 3 or only over a portion of this width.

The second, radially outer ring element 3 is arranged in radial direction above the first, radially inner ring element 2 and in particular concentrically to the latter.

The connecting element 4 is arranged between the first, radially inner ring element 2 and the second, radially outer ring element 3. By means of said connecting element 4 the first, radially inner ring element 2 and the second, radially outer ring element 3 are joined together to form the gear 1.

Axially outer edges 11, 12, i.e. the edges 11, 12, are provided in the transitional area from a radial surface 13 to axial end faces 14, 15 of the first, radially inner ring element 2 and axially outer edges 16, 17, i.e. the edges 16, 17 in the transitional area from a radial surface 18 to axial end faces 19, 20 of the second, radially outer ring element 3 are designed to be rounded to achieve the aforementioned effects, i.e. provided with a rounding 21 to 24.

It should be noted that in the shown embodiment variant of the gear 1 the radial surface 13 is the radially outer end face of the first, radially inner ring element 2 and the radial surface 18 is the radially inner end face of the second, radially outer ring elements 3, i.e. the surfaces of the two ring element 2, 3, which point towards one another in the assembled state of the gear.

The radius of the roundings 21 to 24 is preferably selected from a range of 0.1 mm to 2 mm, in particular from a range of 0.4 mm to 1.5 mm.

It is possible, that the radius of all of the roundings 21 to 24 is of equal size. However, it is also possible that at least one of the roundings 21 to 24 has a radius that is different from the remaining roundings 21 to 24. For example, the two roundings 21, 22 of the first, radially inner ring element 2 can have a larger radius than the two roundings 23 to 24 of the second, radially outer ring element 3. However, it is also possible that the roundings 21 and 23 in the region of one axial side of the gear 1, e.g. in the region of the axial end faces 14, 19, have a larger radius, i.e. the roundings 22 and 24 of the second axial side of the gear 1, e.g. in the region of the axial end faces 15, 20. By means of these embodiment variants of the gear 1, i.e. the different configuration of the roundings 21 to 24, different types of loads on the gear 1 in axial and radial direction can handled more effectively.

In the simplest case the roundings 21 to 24 can be configured as part circles, for example quarter circles, or can be elliptical. However, other configurations of the roundings are also possible, as described in more detail in the following.

As shown in particular in FIG. 2 the connecting element 4 can protrude in axial direction over the first, radially inner ring element 2 and the second, radially outer ring element 3 and in radial direction partly overlapping the first, radially inner ring element 2 and/or the second, radially outer ring element 3. The connecting element 4 can thus in particular have an at least approximately H-shaped or an H-shaped cross section.

However, it is also possible, if not preferable, to design the connecting element 4 to be flush with the axial end faces 14, 15 of the first, radially inner ring element 2 and/or flush with the axial end faces 19, 20 of the second, radially outer ring element 3.

It is also possible that the connecting element 4 only projects in the region of the axial end faces 14, 19 or only in the region of the axial end faces 15, 20 of the first, radially inner ring element 2 and the second, radially outer ring element 3 in axial direction over said surfaces and partly overlaps the latter in radial direction.

Figures 3, 4, 5:
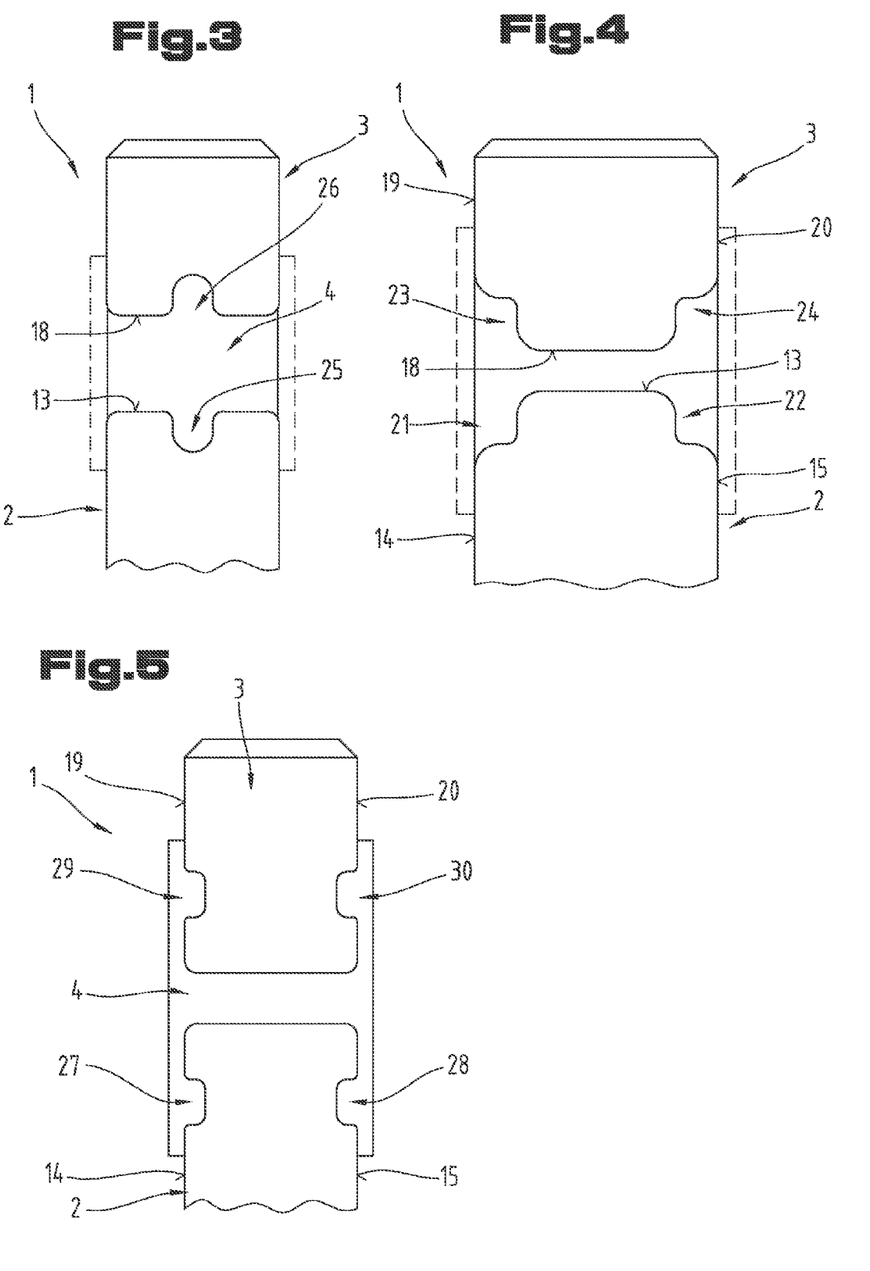
FIG. 3 a section of a further embodiment variant of the gear in cross section.
FIG. 4 a section of another embodiment variant of the gear in cross section.
FIG. 5 a section of another embodiment variant of the gear in cross section.

FIGS. 3 to 5 show further and possibly independent embodiments of the gear 1, whereby for the same parts the same reference numerals or component names are used as in the preceding FIGS. 1 and 2. To avoid unnecessary repetition reference is made to the detailed description of said FIGS. 1 and 2.

As shown in FIG. 3, according to one embodiment variant of the gear 1, the first, radially inner ring element 2 has at least one recess 25 on the radial surface 13 and/or the second, radially outer ring element 3 has a recess 26 on the radial surface 18, wherein the connecting element 4 engages in the recess 25 or 26 or the recesses 25, 26.

The recess 25 or 26 or recesses 25, 26 can only be arranged in discrete areas over the outer periphery of the first, radially inner ring element 2 and the inner periphery of the second, radially outer ring element 3, whereby of course a plurality of discrete recesses 25, 26 can be provided, in particular can be distributed evenly over the outer periphery of the first, radially inner ring element 2 and the inner periphery of the second, radially outer ring element 3. In the preferred embodiment variant however the recesses 25, 26 are configured as annular grooves.

It is also possible that only one annular groove-shaped recess 25 and/or one annular groove-shaped recess 26 is or are provided. However, it is also possible to provide a plurality of annular groove-shaped recesses 25 and/or a plurality of annular groove-shaped recesses 26 in axial direction next to one another and separately from one another in the radial surfaces 13 or 18. For example, the radial surface 13 or 18 can be designed to be at least approximately wave-like or the radial surfaces 13, 18 can be designed to be approximately wave-like or the radial surface 13 or 18 or the radial surfaces 13, 18 can be designed in the manner of a toothing with a plurality of annular groove-shaped recesses 25 and/or 26 arranged next to one another.

It is also possible to have a combination of at least one discrete recess 25 with at least one annular groove-shaped recess 25 in the radial surface 13 and/or a discrete recess 26 with at least one annular groove-shaped recess 26 in the radial surface 18.

Preferably, for the aforementioned reasons the edges of the recesses 25, 26 in the radial surfaces 13, 18 are also provided with a rounding, as shown in FIG. 3.

As shown in FIG. 4 it is also possible that the transitional areas between the radial surface 13 and the axial end faces 14, 15 of the first, radially inner ring element 2 and/or the transitional areas between the radial surface 18 and the axial end faces 19, 20 of the second, radially outer ring element 2 is/are designed to be graduated. In particular, all of said transitional areas can be configured to be graduated. In other words the roundings 21 to 24 of the edges 11, 12 (FIG. 2) of the first, radially inner ring element 2 and/or the edges 16, 17 (FIG. 2) of the second, radially outer ring element 3 are each provided with roundings 21, 22 or 23, 24, which have a non-uniform rounding radius.

It is possible in this case that at least one of the roundings 21 to 24, for example two or all four, has a first positive radius area (outwardly pointing rounding area), an adjoining negative radius area (inwardly pointing rounding) and adjoining the latter a second positive radius area (outwardly pointing rounding area).

At least one of the roundings 21 to 24 can thus be provided with an at least approximately wave-like profile.

By means of said embodiments the connection between the connecting element 4 and the first, radially inner ring element 2 and the second, radially outer ring element 3 can also be improved.

Also more than one graduation can be provided in the region of at least one of the roundings 21 to 24, for example two graduations or three graduations, etc., on the first, radially inner ring element 2 and/or on the second, radially outer ring element 3.

Both in the embodiment variant of the gear 1 according to FIG. 3 and in the embodiment variant of the gear according to FIG. 4, the connecting element 4 can be arranged flush with the first, radially inner ring element 2 and/or the second, radially outer ring element 3 or projecting over the latter in axial direction and partly overlapping in radial direction (shown by dashed lines in FIGS. 3 and 4), as explained above.

FIG. 5 shows a section of a further embodiment variant of the gear 1. In this case the first, radially inner ring element 2 on at least one of the axial end faces 14, 15 comprises at least one recess 25 and/or the second, radially outer ring element 3 on at least one of the axial end faces 19, 20 comprises a recess 29, 30, wherein the connecting element 4 engages in at least one of the recesses 27 to 30 or in the recesses 27 to 30.

The recesses 27 to 30 can be arranged only in discrete areas in the axial end faces 14, 15 of the first, radially inner ring element 2 and the axial end faces 19, 20 of the second, radially outer ring element 3, wherein of course a plurality of discrete recesses 27 to 30 can be provided, in particular can be distributed evenly. In the preferred embodiment variant the recesses 27 to 30 are in the form of annular grooves however.

Furthermore, it is possible for only one annular groove recess 27, 28 and/or one annular groove recess 29, 30 to be provided. However, it is also possible to provide a plurality of annular groove recesses 27, 28 and/or a plurality of annular groove recesses 29, 30 above one another in radial direction and separated from one another in the axial end faces 14, 15, 19, 20. For example at least one of the axial end faces 14, 15, 19, 20 can be designed to be at least approximately wave-like or the axial end faces 14, 15, 19, 20 can be designed to be approximately wave-like or the axial end face 17 and/or 15 and/or 19 and/or 20 or the axial end faces 14 to 20 can be designed at least in the area of the connecting element 4 in the form of a toothing with a plurality of annular groove-shaped recesses 27 and/or 28 and/or 29 and/or 30 arranged next to one another.

Furthermore, it is also possible to combine at least one discrete recess 27 to 30 with at least one annular groove-shaped recess 27 to 30 in the axial end faces 14, 15, 19, 20.

Preferably, for the aforementioned reasons the edges of the recesses 27 to 30 are also provided with a rounding in the axial end faces 14, 15, 19, 20, as shown in FIG. 5.

All of the rounding radii of the edges of the individual embodiment variants of the gear 1 can be selected from the aforementioned ranges.

For the production of the of the gear 1 the connecting element 4 can be preshaped and then connected to the first, radially inner ring element 2 and the second, radially outer ring element 3, for example solely by static friction or by the use of a bonding agent, such as e.g. an adhesive.

However, in the preferred embodiment variant of the gear the connecting element 4 is vulcanized in a suitable form onto the radially inner ring element 2 and the radially outer ring element 3, in particular hot vulcanized.

To improve the formation of the connection it is also possible that at least one of the radial surfaces 13, 18 and/or at least one of the axial end faces 14, 15, 19, 20, in particular all of the radial surfaces 13, 18 and/or at least one of the axial end faces 14, 15, 19, 20, is roughened at least in the region of the connection to the connecting element 4, for example by (sand)blasting or grinding etc.

However, it is also an advantage if open-pored sintered components are used at least in the connecting areas for the first, radially inner ring element 2 and/or the second, radially outer ring element 3, as in this way also a type of interlocking can be achieved between the connecting element 4 and the first, radially inner ring element 2 and/or the second, radially outer ring element 3.

It can also be an advantage if at least the surfaces of the first, radially inner ring element 2 and/or the second, radially outer ring element 3 in the region of the connection to the connecting element 4 are subjected to a plasma pretreatment or plasma activation.

Figure 6:
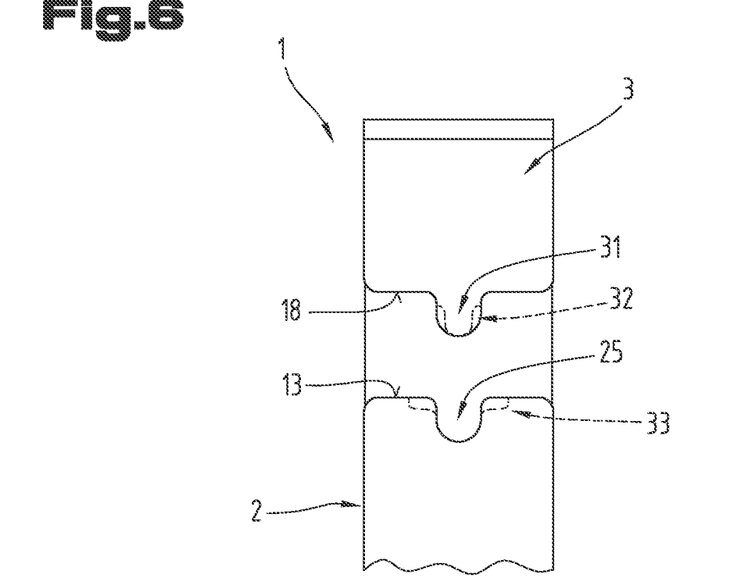
FIG. 6 a section of a further embodiment variant of the gear in cross section.

FIG. 6 illustrates that combinations of the embodiment variants of the gear 1 are also possible. In this case the radially inner ring element 2 comprises the at least one recess 25, similar to the embodiment variant of the gear 1 according to FIG. 3.

Therefore, all of the explanations above relating to the radially inner ring element 2 of the embodiment variant according to FIG. 3 can be transferred to the embodiment variant according to FIG. 6 and particular reference is made to the latter.

However, the radially outer ring element 3 is designed to have at least one projection 31, similar to the embodiment variant of the gear 1 according to FIG. 4. Said projection 31 extends over the radial inner surface 18 of the second radially outer ring element 3 projecting in the direction of the first, radially inner ring element 2. In particular, the at least one projection 31 is designed as an annular web, which like the annular groove-like recess 25 in this and/or the other embodiment variants of the gear 1 is designed to extend over the whole periphery. The periphery is thereby relative to the surface 18 of the radially outer ring element 3 in respect of the at least one projection 31 and the surface 13 in respect of the at least one recess 25.

Also more than one, in particular annular-web like projection 31 can be provided on the radially inner surface 18 of the second radially outer ring element 3. For example two, three, four etc. projections 31 which are arranged or formed next to one another and spaced apart from one another in the axial direction of the gear.

In addition, it is possible that the projection 31 or at least one of the plurality of projections 31 is designed to have at least one graduation 32—as viewed in radial direction—as indicated by a dashed line in FIG. 6. Likewise, alternatively or in addition the at least one recess 25 of the first radially inner ring element 2 is designed to have a graduation 33, as also shown by a dashed line in FIG. 6. The latter can also be provided in all other embodiment variants of the gear 1.

All of the edges of the at least one projection 31 can be provided with roundings, whereby the radii of the roundings can be selected from the aforementioned range.

By means of the arrangement of a plurality of projections 31 lying next to one another in axial direction an at least approximately wave-like or a tooth-shaped design of the radially inner surface 18 can be achieved, as already explained above.

In the embodiment variant of the gear 1 shown in FIG. 6 the projection 31 is located as viewed in radial direction precisely above the at least one recess 25. It is also possible however, that the at least one projection 31 is arranged offset in axial direction to at least one recess 25. In this case it can be an advantage if a plurality of projections 31 are arranged, wherein the at least one recess 25 is arranged as viewed in axial direction between the projections 31.

Of course, within the scope of the invention an inverse design of the gear is possible, in which the at least one projection 31 is arranged or formed on the first radially inner ring element 2 and the at least one recess 25 is arranged or formed on the second radially outer ring element 3. The aforementioned embodiments of the embodiment variant of the gear according to FIG. 6 are also adapted accordingly to be applied to said inverse embodiment variant. The arrangement of the at least one projection 31 on the second, radially outer ring element 3 and the at least one recess on the first, radially inner ring element 2 is preferred however.

Figure 7:
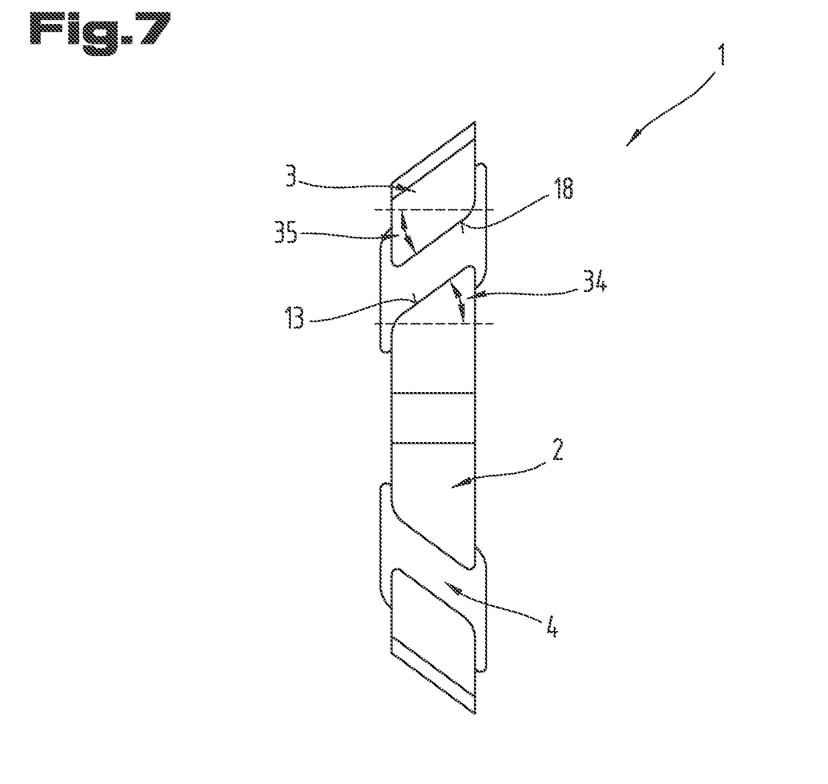
FIG. 7 a cross section of another embodiment variant of the gear.

FIG. 7 shows a further embodiment variant of the gear 1. Said embodiment variant is particularly suitable for cone gears and/or helical gears. In this case the radial surface 13 (casing surface) of the first inner ring element 2 is inclined relative to the axial direction at an angle 34, i.e. the first radially inner ring element 2 is configured to have a truncated cone shape. Likewise the radially inner surface 18 of the second radially outer ring element 3 is inclined at an angle 35 to the axial direction. The dividing plane of the two parts of the gear 1 is thus, unlike the embodiment variants of the gear 1 described above, not axially parallel but at an angle thereto.

Preferably, the absolute values of the two angles 34, 35 are of different sizes. The two surfaces 13 and 18 are preferably not parallel to one another.

The intermediate space between the first radially inner ring element 2 and the second radially outer ring element 3 is filled by the connecting element 4.

The two angles 34, 35 can have a value for example of a maximum of 50°, in particular selected from a range of 0.1° to 40°.

All of the embodiments relating to the roundings of edges, the recesses in the surfaces 13 and/or 18 and/or the projections 31 on the surfaces 13 and/or 18 can also be applied to the embodiment variant of the gear 1 according to FIG. 7.

The example embodiments show possible embodiment variants of the gear 1, whereby it should be noted at this point that various different combinations of the individual embodiment variants are possible.

Lastly, as a point of formality it should be noted that for a better understanding of the structure of the gear 1, the latter and/or its components have not been represented to scale in part and/or have been enlarged or reduced in size.

List of Reference Numerals

| | |
|---|---|
| 1 | gear |
| 2 | ring element |
| 3 | ring element |
| 4 | connecting element |
| 5 | recess |
| 6 | unbalance element |
| 7 | recess |
| 8 | unbalance mass |
| 9 | hub area |
| 10 | toothing |
| 11 | edge |
| 12 | edge |
| 13 | surface |
| 14 | end face |
| 15 | end face |
| 16 | edge |
| 17 | edge |
| 18 | surface |
| 19 | end face |
| 20 | end face |
| 21 | rounding |
| 22 | rounding |
| 23 | rounding |
| 24 | rounding |
| 25 | recess |
| 26 | recess |
| 27 | recess |
| 28 | recess |

List of Reference Numerals

| | |
|---|---|
| 29 | recess |
| 30 | recess |
| 31 | projection |
| 32 | graduation |
| 33 | graduation |
| 34 | angle |
| 35 | angle |

The invention claimed is:

1. A gear comprising
a radially inner ring element having a first radial surface and first axial end faces,
a radially outer ring element having a second radial surface and second axial end faces, and
a connecting element,
the radially outer ring element comprising a toothing,
the connecting element being arranged in a radial direction between the radially inner ring element and the radially outer ring element and being connected to the radially inner ring element and the radially outer ring element, and
the connecting element comprising a rubber-elastic material,
wherein edges between the first radial surface and the first axial end faces of the radially inner ring element and edges between the second radial surface and the second axial end faces of the radially outer ring element are rounded.

2. The gear as claimed in claim 1, wherein the connecting element extends projecting in an axial direction over the radially inner ring element and the radially outer ring element and in the radial direction partly overlaps the radially inner ring element and the radially outer ring element.

3. The gear as claimed in claim 2, wherein the radially inner ring element comprises on at least one axial end face at least one recess or the radially outer ring element on at least one axial end face comprises at least one recess and the connecting element engages in the recess or the recesses.

4. The gear as claimed in claim 3, wherein edges of the recesses in the axial end faces are also rounded.

5. The gear as claimed in claim 1, wherein the radially inner ring element on at least one radial surface comprises at least one recess or the radially outer ring element on at least one radial surface comprises at least one recess and the connecting element engages in the at least one recess.

6. The gear as claimed in claim 5, wherein edges of the recesses in the radial surfaces are also rounded.

7. The gear as claimed in claim 1, wherein the connecting element is vulcanized onto the radially inner ring element and the radially outer ring element.

8. The gear as claimed in claim 1, wherein the radially inner ring element is arranged on an unbalance element.

* * * * *